United States Patent [19]

Sekmakas et al.

[11] 4,263,189

[45] Apr. 21, 1981

[54] CATIONIC AMINE-FUNCTIONAL COPOLYMER CONDENSATES

[75] Inventors: Kazys Sekmakas, Palatine; Raj Shah, Schaumburg, both of Ill.

[73] Assignee: DeSoto, Inc., Des Plaines, Ill.

[21] Appl. No.: 103,907

[22] Filed: Dec. 17, 1979

[51] Int. Cl.³ .............................................. C08L 61/10
[52] U.S. Cl. ............................... 260/29.3; 204/181 C; 260/32.8 R; 260/33.2 R; 525/142
[58] Field of Search ......... 260/29.3, 29.6 TA, 32.8 R, 260/33.2 R; 525/137, 142; 204/181 C

[56] References Cited

U.S. PATENT DOCUMENTS

| | | | |
|---|---|---|---|
| 3,159,597 | 12/1964 | Forsythe | 525/137 |
| 3,896,017 | 7/1975 | Sekmakas | 260/29.3 |
| 3,963,663 | 6/1976 | Sekmakas | 260/29.3 |
| 4,129,544 | 12/1978 | Craig | 260/29.3 |

*Primary Examiner*—Theodore E. Pertilla
*Attorney, Agent, or Firm*—Dressler, Goldsmith, Shore, Sutker & Milnamow, Ltd.

[57] ABSTRACT

Water dispersible cationic amine-functional copolymer condensates are prepared by heat reacting in solution in water miscible organic solvent a solution copolymer containing from 3% to 35% of monomer having a basic amino group and from 20% to 50% of isobutoxymethyl acrylamide or methacrylamide, the amine groups in the copolymer being at least partially neutralized by a solubilizing acid, with from 5% to 40% of a solvent-soluble, heat-hardening condensate of a phenol having at least two aldehyde-reactive positions with at least two mols of formaldehyde per mol of the phenol, the phenolic condensate being poorly dispersible in water until after condensation with the copolymer.

11 Claims, No Drawings

CATIONIC AMINE-FUNCTIONAL COPOLYMER CONDENSATES

DESCRIPTION

This invention represents an improvement over our prior application Ser. No. 20,668 filed Mar. 15, 1979, now U.S. Pat. No. 4,198,495, issued Apr. 15, 1980, and also Ser. No. 085,199 filed Oct. 16, 1979.

1. Technical Field

This invention relates to cationic amine-functional copolymer condensates which electrodeposit at the cathode to provide improved chemical resistance.

2. Background Art

In our said prior applications, cationic amine-functional copolymers useful in cationic electrocoating are disclosed in which the copolymers are solution copolymers containing from 3% to 35% of monomer having a basic amino group. These copolymers also include a large amount of isobutoxymethyl acrylamide, namely, from 20% to less than 35% in Ser. No. 085,199 and from 35% to 50% in Ser. No. 20,688. The copolymer is at least partially neutralized with a solubilizing acid to render the copolymer cationic and dispersible in water.

The electrodeposited and cured coatings produced in said prior applications possess superior detergent and corrosion resistance for copolymers systems which are primarily constituted by copolymerized monoethylenic monomers, but further improvement is desired, and is the subject of this invention.

DISCLOSURE OF INVENTION

In accordance with this invention, a solution copolymer of monoethylenically unsaturated monomers consisting essentially of from 3% to 35% of monomer having a basic amino group, from 20% to 50% of isobutoxymethyl acrylamide or methacrylamide, from 0% to 15% of monomer providing active hydrogen atoms coreactive with N-methylol functionality, and the balance of the copolymer consisting essentially of nonreactive monomers, said proportions being based on the weight of the copolymer, is partially condensed by heat reacting the same in solution in water miscible organic solvent with from 5% to 40%, based on the weight of the copolymer of a heat-reactive polymethylol-functional phenol-formaldehyde condensate which is poorly dispersible in water. The condensate is dispersible in water with the aid of a solubilizing acid and it electrodeposit at the cathode and cures on baking to provide films which have better salt spray and detergent resistance than was obtainable in our prior applications.

It should be appreciated that phenolic resins have previously been used to cure cationic copolymers, but these phenolic resins were water dispersible "A" stage resols, and they were not condensed with acrylic copolymers. The phenolic resins used herein are solvent soluble materials which are poorly water dispersible in the absence of partial condensation.

The use of a partial condensation of a phenolic resin with a cationic resin dispersible by salt formation with a solubilizing acid is itself known per Sekmakas U.S. Pat. Nos. 3,986,017 and 3,963,663. However, these disclosures relate to hydroxy-functional copolymers, not amine copolymers containing the isobutoxymethyl acrylamide group where amine functionality retards the reactivity of the reactive group carried by the acrylamide moieties in the copolymer.

In this invention it has been found that the partial neutralization of the amine functionality in the copolymer enables the condensation reaction with the phenolic resin to be controllably carried out to provide the essential prereaction which enables the phenolic resin to be effectively and stably dispersed in water.

Let us first consider the monoethylenically unsaturated monomers which are copolymerized in organic solvent solution to provide the soluble copolymers which are used in accordance with this invention.

The term "nonreactive" to describe a portion of the monomers denotes the absence in the monomer of functional groups, other than the single polymerizable unsaturated group, which will react under the contemplated conditions of polymerization and cure. Normally, this means that no other functional group is present. Suitable nonreactive monomers are illustrated by styrene, vinyl toluene, $C_1$–$C_8$ alkyl esters of monoethylenically unsaturated acids like methyl methacrylate, vinyl acetate acrylonitrile, and the like. In the preferred practice of this invention, styrene and/or vinyl toluene is combined with 2-ethylhexyl methacrylate in amounts providing from 20% to 45% of styrene and/or vinyl toluene to from 25% to 40% of 2-ethylhexyl methacrylate. The use of such a large proportion of 2-ethylhexyl methacrylate improves the hydrolytic stability of the bath.

The amine-functional monomers which may be used are well known and are desirably amino alkyl derivatives of a monoethylenically unsaturated carboxylic acid or an amide thereof. Dimethyl aminoethyl methacrylate is quite suitable, but any monoethylenically unsaturated copolymerizable amine, be it primary, secondary, or tertiary, may be used herein. The tertiary amines are preferred and are most available. Other suitable amine monomers are illustrated by dimethyl aminopropyl methacrylate, monomethyl aminoethyl methacrylate, aminoethyl methacrylate, and the corresponding acrylates, crotonates, and the like. The amino amides are particularly preferred, as illustrated by dimethyl aminopropyl methacrylamide.

The proportion of the amine monomer in the copolymer is subject to considerable variation, but from 3% to 35%, preferably from 10% to 25%, based on the weight of the copolymer, illustrates usual practice.

While reactive monomers other than the isobutoxymethyl acrylamide or methacrylamide may be absent, up to 15% of the weight of the copolymer may be consitituted by a monomer providing active hydrogen atoms which is coreactive with the N-methylol functionality in the copolymer. Among the reactive monomers which may be present in an amount of from 1% to 10%, are amides, such as acrylamide, and hydroxy monomers, such as hydroxy alkyl acrylates and methacrylates in which the alkyl group normally contains from 2–4 carbon atoms. It is especially preferred to employ as the reactive monomer, a monoethylenically unsaturated carboxylic acid, such as acrylic acid, crotonic acid, itaconic acid, or methacrylic acid. Fumaric acid or monoethyl fumarate will further illustrate the acids which may be used.

It is desired to stress the fact that the cure herein involves the removal of alcohol in a condensation reaction which must consume a large number of N-methylol groups. This condensation reaction is catalyzed by the presence of acid, but the acid groups used for solubilization are removed by the electrophoretic action which caused cationic electrodeposition. The presence of the carboxyl groups in the copolymer catalyzes this cure. At the same time, most of the acidity is eliminated by the cure because of the large amount of N-methylol functionality which is present to consume the relatively small proportion of carboxyl functionality.

The isobutoxy ether is essential to this invention. With ethers having less than four carbon atoms present in the isobutoxy ether, hydrolysis in the acidic electrocoating bath provides N-methylol groups and these react slowly to change the characteristics of the bath. The more N-methylol groups, the more the bath changes with time. On the other hand, other ether groups which resist hydrolysis because they contain more than four carbon atoms are not useful because these longer groups are hydrophobic and prevent satisfactory dispersion in water with the aid of an acid. Thus, more acid is needed for water dispersion and the bath pH falls below 5.0 which creates corrosive conditions. In the preferred practice of this invention, the bath pH is in the range of 6.0 to 7.0.

The at least partial neutralization of the large amount of amine functionality in the copolymer permits a controllable reaction to be carried out with the methylol groups of the phenolic resin which will be discussed shortly.

The isobutoxymethyl amide is peferably used in an amount of 20% to 35% since some of the curing reactivity is supplied by the phenolic component of the condensate.

The copolymerization in organic solvent solution is carried out conventionally using a water miscible organic sovlent, moderate heat, and a free radical-generating polymerization catalyst such as azobisisobutyronitrile, benzoyl peroxide or cumene hydroperoxide. Chain terminating agents such as alkyl mercaptans can be used, but are usually absent since the amine itself inhibits the desired copolymerization.

The best copolymers are made by slowly adding the materials to be copolymerized to a heel of the solvent containing a stoichiometric deficiency of the solubilizing acid. This technique is described in our prior application Ser. No. 14,101 filed Feb. 22, 1979. This technique is beneficial, but it is not an essential of this invention.

The preferred acids for solubilizing the amine copolymer condensates are organic acids, such as acetic acid, glycollic acid, and, most preferably, dimethylol propionic acid. However, inorganic acids which do not damage the deposited film, like phosphoric acid, are also useful. Acids which vaporize or decompose are particularly contemplates since it is usually best not to have the solubilizing acid present in the final cured coating. Neutralization is desirably less than 90%, preferably from 25% to 70%, including any carboxylic acid which may be present in the copolymer.

The solubilizing acids are preferably present during the copolymerization, but in any event they are added prior to the condensation reaction with the phenolic resin which is carried out in organic solvent solution with or without removal of the butanol which is the by-product of condensation.

The phenolic resin is a heat-reactive polymethylol-functional reaction product of a phenol with at least about two mols of formaldehyde per mol of phenol. Any phenol containing at least two aldehyde-reactive positions may be use, and these are illustrated by phenol, para-tertiary-butyl phenol, cresol, and a bisphenol like bisphenol A. To provide a product containing methylol groups, the reaction is carried out in the presence of an alkaline catalyst, such as sodium hydroxide. This reaction normally produces a water soluble reaction product, but here needed molecular weight is provided by continueing the reaction until the molecular weight is high enough to provide water insolubility. The temperature of reaction should not exceed 115° C. and it can be carried out in water or in alcohol solution. When an alcohol is used, a water miscible alcohol like methanol, ethanol or a propanol is preferred. The reaction is normally carried out in water which is removed under vacuum to provide a solid product which is then placed in solvent solution for use in this invention. If alcohol is used in the reaction it can be allowed to remain and etherification of the methylol groups with the alcohol is permissible.

These phenolic resins are poorly water dispersible and to provide stable water dispersions they must be prereacted with the etherified N-methylol groups of the at least partially neutralized amine-functional copolymer. As previously noted, partial neutralization permits this reaction to proceed in a controllable fashion to provide a reaction product which stably disperses and which retains methylol groups for subsequent cure.

The condensation reaction with the phenolic resin is carried out by simply cooking the two resins together in solvent solution and then sampling the reaction product and testing its water dispersibility as the reaction proceeds. The reaction temperature can range from about 60° C. to about 110° C. and is preferably in the range of from 70° C. to 90° C. The minimum reaction time at any temperature can be gauged by the fact of producing a stable non-separating aqueous dispersion. The fact of excessive reaction is shown by the formation of gelled insoluble particles.

BEST MODE FOR CARRYING OUT THE INVENTION

The invention is illustrated by the following Examples in which all proportions are by weight unless otherwise stated.

EXAMPLE 1

| Grams | Component |
|---|---|
| 321 | 2-butoxy ethanol |
| 40 | Dimethylol propionic acid (to neutralize thE amino monomer to 50%) |

The above are charged to a reactor and heated to 95° C. to form a heel of solution in which the polymerization is carried out.

| Grams | Component |
|---|---|
| 145 | Isobutoxymethyl acrylamide |
| 218 | Styrene |
| 191 | 2-ethylhexyl methacrylate |
| 105 | Dimethyl aminopropyl methacrylamide |
| 12 | Azobisisobutyronitrile |

The above are premixed and added to the heel of acid-containing solvent slowly over a 3 hour period while maintaining 90° C. When this addition is finished, most of the polymerization has been completed. To insure completion of reaction, 2 grams of azobisisobutyronitrile are added and the temperature is maintained at 90° C. for one hour, and this procedure is repeated one more time, at which point conversion of monomer to polymer is complete.

EXAMPLE 2

A solvent soluble, heat-hardening phenolic resin is dissolved in equal parts of methyl ethyl ketone and 2-butoxy ethanol to form a 50% solids solution of the phenolic resin. This solution is gradually added to the amine copolymer solution of Example 1 at 80° C. over a 2 hour period to provide a solution containing 15% phenolic resin solids and 85% of amine copolymer solids. This solution is held at 80° C. for an additional hour after all the phenolic resin is present in order to insure that a water dispersible reaction product is formed, whereupon the solution is cooled to room temperature.

The achievement of reaction is established by the fact that the same phenolic resin is not stably dispersible in the final aqueous dispersion in the absence of the extended reaction period at elevated temperature which has been described. Once experience has been gained with any particular system, then one can simply carry out the reaction for the time period previously used without sampling and checking during the reaction.

The phenolic resin used in this example is a commercially available product obtainable from Union Carbide Corporation under the trade designation CKM 2400 which is available in the form of solid flakes (100% solids). However, equivalent results may be obtained using the General Electric product Methylon 9302 which is available in 80% solids solution in butanol. When Methylon 9302 is used, the amount of 2-butoxy ethanol should be reduced by an amount equal to the weight of the butanol introduced by the Methylon 9302 solution.

A phenolic resin which may be used in this example in place of the commercial materials identified above can be provided as follows:

Into a reactor equipped with a reflux condenser add 140 parts of phenol, 114 parts of paraformaldehyde, 196 parts of deionized water and 16 parts of sodium hydroxide. The reflux condenser is then set and heat is applied to heat to 93° C. in 1 hour. The heat should then be turned off and the exothermic reaction causes the temperature to increase somewhat. The reaction mixture is then allowed to cool to 90° C. and it is held at this temperature until gel particles form in the water solution. When the molecular weight build has progressed to the point of water insolubility, vacuum is applied to remove the water and provide a solid solvent-soluble phenolic resin product.

EXAMPLE 3

Enough deionized water is added to the condensate of Example 2 with rapid agitation to provide an aqueous bath which is a milky dispersion having a solids content of about 28% and a pH of about 6.5.

INDUSTRIAL APPLICATION

Electrodeposition at the cathode after dilution with deionized water to 10% solids content proceeds well at 75 volts. The coated cathode is removed from the bath and cured by baking in an oven having a temperature of 350° F. or higher, the lower the baking temperature, the longer the time needed for cure. 400° F. to 450° F. for 30 to 15 minutes is a typical curing schedule. In this example, coated panels are baked for 20 minutes at 400° F. and have excellent methyl ethyl ketone resistance and outstanding salt spray and detergent resistance. The bath is stable and retains its desirable characteristics on prolonged use.

We claim:

1. Water dispersible cationic amine-functional copolymer condensates prepared by heat reacting in solution in water miscible organic solvent: 1- a solution copolymer of monoethylenically unsaturated monomers consisting essentially of, based on the weight of the copolymer, from 3% to 35% of monomer having a basic amino group, from 20% to 50% of isobutoxymethyl acrylamide or methacrylamide, from 0% to 15% of monomer providing active hydrogen atoms coreactive with the N-methylol group, and the balance being nonreactive monomers, and the amine groups in the copolymer being at least partially neutralized by a solubilizing acid, with; 2-from 5% to 40%, based on the weight of the copolymer, of a solvent-soluble, heat-hardening polymethylol-functional condensate of a phenol having at least two aldehyde-reactive positions with at least two mols of formaldehyde per mol of said phenol, said condensate being poorly dispersible until after condensation with said copolymer.

2. Cationic amine-functional copolymer condensates as recited in claim 1 in which said monomer having a basic amino group is a tertiary amine.

3. Cationic amine-functional copolymer condensates as recited in claim 2 in which said amine monomer is a dimethyl aminoalkyl derivative of a monoethylenically unsaturated carboxylic acid or an amide thereof.

4. Cationic amine-functional copolymer condensates as recited in claim 3 in which said copolymer is neutralized in an amount of from 25% to 75%.

5. Cationic amine-functional copolymer condensates as recited in claim 1 in which isobutoxymethyl acrylamide is used.

6. Cationic amine-functional copolymer condensates as recited in claim 1 in which the nonreactive monomers consist essentially of styrene and/or vinyl toluene in admixture with 2-ethylhexyl methacrylate.

7. Cationic amine-functional copolymer condensates as recited in claim 6 in which said amine monomer is used in an amount of from 10% to 25%.

8. Cationic amine-functional copolymer condensates as recited in claim 1 in which said copolymer condensate is present in stable dispersion in water to provide a bath having a pH in excess of pH 5.0.

9. Cationic amine-functional copolymer condensates as recited in claim 8 which said water dispersion has a pH in the range of pH 6.0–7.0.

10. Cationic amine-functional copolymer condensates as recited in claim 1 in which said heat reaction is carried out at a temperature of from about 60° C. to about 110° C. until the product is not stably dispersible in water.

11. Cationic amine-functional copolymer condensates as recited in claim 10 in which said heat reaction is carried out at a temperature of from 70° C. to 90° C.

* * * * *